(12) United States Patent
Colon

(10) Patent No.: US 7,962,546 B2
(45) Date of Patent: Jun. 14, 2011

(54) METHOD FOR TRANSMITTING CONTENT TO AT LEAST ONE RECIPIENT WITH MOBILE EQUIPMENT

(75) Inventor: François Colon, Marseilles (FR)

(73) Assignee: Miyowa, Paris (FR)

( * ) Notice: Subject to any disclaimer, the term of this patent is extended or adjusted under 35 U.S.C. 154(b) by 64 days.

(21) Appl. No.: 11/950,792

(22) Filed: Dec. 5, 2007

(65) Prior Publication Data

US 2008/0183846 A1    Jul. 31, 2008

(30) Foreign Application Priority Data

Dec. 6, 2006 (FR) ..................................... 06 55341

(51) Int. Cl.
*G06F 15/16* (2006.01)
(52) U.S. Cl. ........................ 709/203; 709/217; 709/219
(58) Field of Classification Search .................. None
See application file for complete search history.

(56) References Cited

U.S. PATENT DOCUMENTS

| | | | |
|---|---|---|---|
| 7,032,030 B1* | 4/2006 | Codignotto | 709/246 |
| 7,353,016 B2* | 4/2008 | Roundtree et al. | 455/414.1 |
| 2002/0010746 A1* | 1/2002 | Jilk et al. | 709/206 |
| 2003/0208557 A1* | 11/2003 | Higbee et al. | 709/218 |
| 2005/0205660 A1* | 9/2005 | Munte | 235/379 |
| 2006/0195506 A1* | 8/2006 | Deng | 709/203 |
| 2007/0250496 A1* | 10/2007 | Halliday et al. | 707/5 |

* cited by examiner

*Primary Examiner* — John B. Walsh
(74) *Attorney, Agent, or Firm* — Harness, Dickey & Pierce, P.L.C.

(57) ABSTRACT

A method is disclosed for sending content from a mobile sending device belonging to an originator to at least one receiving device associated with a respective recipient. The mobile sending device sends said content to a storage server; the storage server stores the content, associating a content identifier with it; the storage server builds a content page including the content, the content page being associated with a first address, the first address depending at least on the content identifier; the storage server sends the mobile sending device a first message including a second address associated with a recipient-selection page; the mobile sending device accesses said recipient-selection page by the second address; and the originator builds, by the recipient-selection page, a list including an identifier of the receiving device.

18 Claims, 3 Drawing Sheets

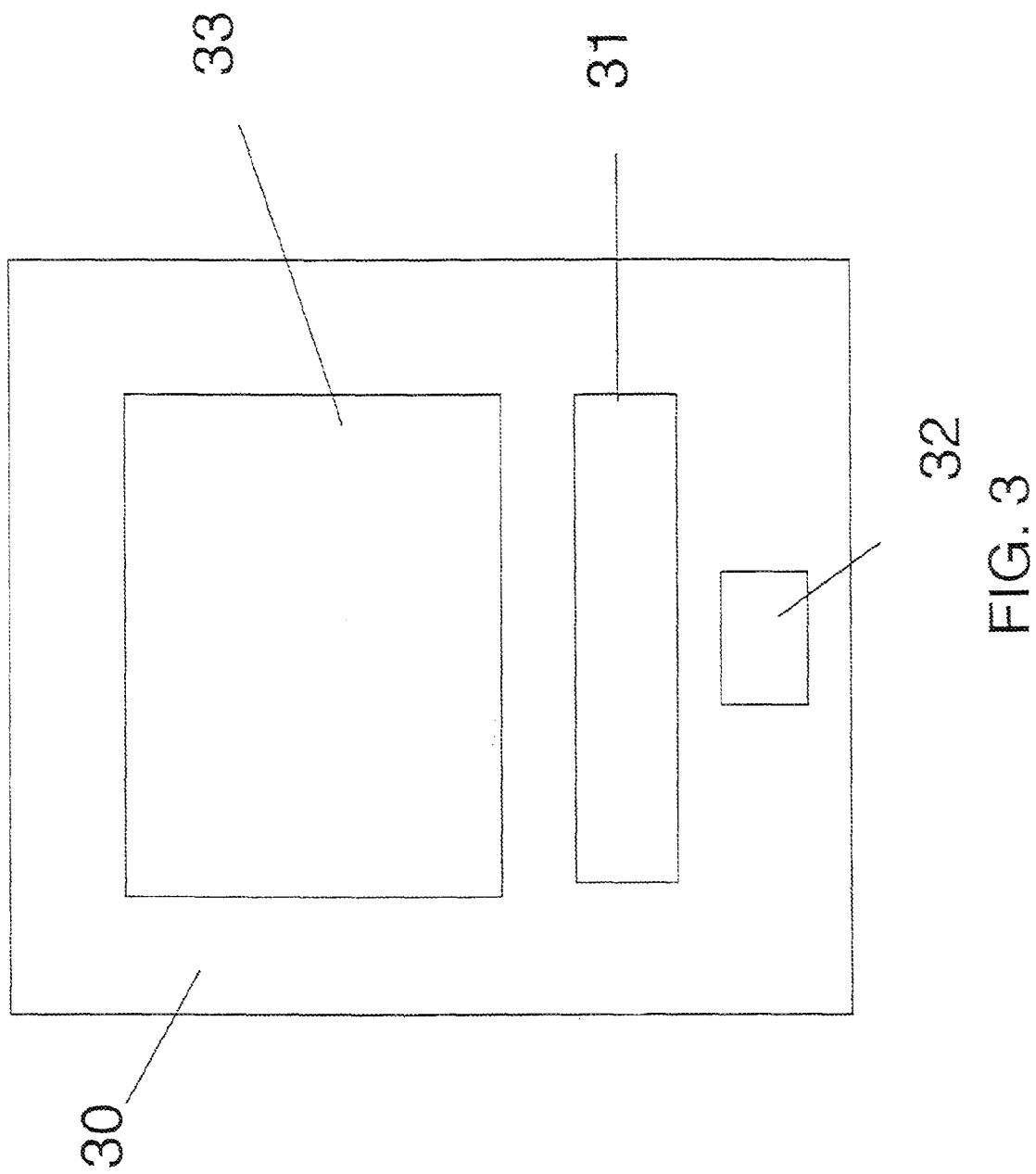

METHOD FOR TRANSMITTING CONTENT TO AT LEAST ONE RECIPIENT WITH MOBILE EQUIPMENT

CROSS-REFERENCE TO RELATED APPLICATIONS

This application claims priority to French Application No. 0655341, filed Dec. 6, 2006, which is incorporated by reference herein.

BACKGROUND AND SUMMARY

The invention relates to a method for sending content from a mobile sending device belonging to an originator to a mobile receiving device associated with at least one respective recipient.

In the state of the art, it is known for example to send content as an attachment of a plurality of SMS messages from a mobile device. However, such a method is tiresome as it requires the originator wanting to send the content to send several SMS messages to the plurality of recipients. However, it is important for a content transmission method to be straightforward for the originator.

It is also known in the state of the art to make content available to the public by means of a personal page which can be accessed from the internet. Such personal websites are also known as "blogs". However, standard mobile devices do not necessarily possess the functionalities required to generate such personal pages. Furthermore, in such a method, the content originator cannot easily control who is authorised to view the content. In particular, the originator cannot select specific recipients for the content. Furthermore, the content originator does not have simple means for instantly notifying the recipients when new content is available.

The invention aims to solve the aforementioned disadvantages. In particular, one of the problems solved by the invention is to supply a method such as previously described, which is straightforward for the content originator. Another problem solved by the invention is to supply a method such as previously described, which allows the content originator to select the recipients of the content. Another problem solved by the invention is to supply a method such as previously described, which can be implemented using a standard mobile device.

At least one of these problems is solved by the invention, which relates to a method for sending content from a mobile sending device belonging to an originator to at least one receiving device associated with a respective recipient, characterised in that it includes steps in which:

Said mobile sending device sends said content to a storage server;
   Said storage server stores said content, associating a content identifier with it;
   Said storage server builds a content page including said content, said content page being associated with a first address, said first address depending at least on said content identifier;
   Said storage server sends said mobile sending device a first message including a second address associated with a recipient-selection page;
   Said mobile sending device accesses said recipient-selection page by means of said second address;
   Said originator builds, by means of said recipient-selection page, a list including an identifier of said receiving device;
   Said server sends said receiving device a second message including at least said first address;
   Said recipient accesses said content page by means of said first address.

Thanks to this method, at least one privileged recipient of the content is easily selected by the originator using the recipient-selection page. In addition, according to the invention, the originator only sends the content once to the server. The previously described method has the additional advantage that the content pages, in particular WAP pages, are opened by the user and at least one recipient, which is advantageous for the operator of the network that carries the data exchanged according to the invention. It is, in fact, desirable for these operators for the content to be sent increasing the number of pages opened during the transmission process.

According to the invention, it is also understood that the sending device and the recipient devices only require browsing functionalities in order to open the content pages, which is standard for example in currently available mobile telephones. In addition, with a view to simplifying the exchanges between the server and the originator in the aforementioned method, said mobile device sends said content to the storage server in an MMS message, and said storage server sends said first message to said mobile sending device in an SMS message including said second address in the form of a first WAP push link, and said sending device accesses said recipient-selection page by activating said first WAP push link, so as to open a WAP browser in the sending device.

Likewise, in order to simplify the exchanges between the server and the recipient in the aforementioned method, said server sends the second message to said receiving device in an SMS message including said second address in the form of a second WAP push link, and the receiving device accesses said content page with the help of said second address, by activating said second WAP push link, so as to open a WAP browser in the receiving device. The content can possibly be sent to a plurality of receiving devices associated with a plurality of recipients.

BRIEF DESCRIPTION OF DRAWINGS

One embodiment of the invention is described below in relation to the appended drawings, wherein:

FIG. 3 depicts an content page generated by a server according to one embodiment of the invention.

DETAILED DESCRIPTION

Figure 1:
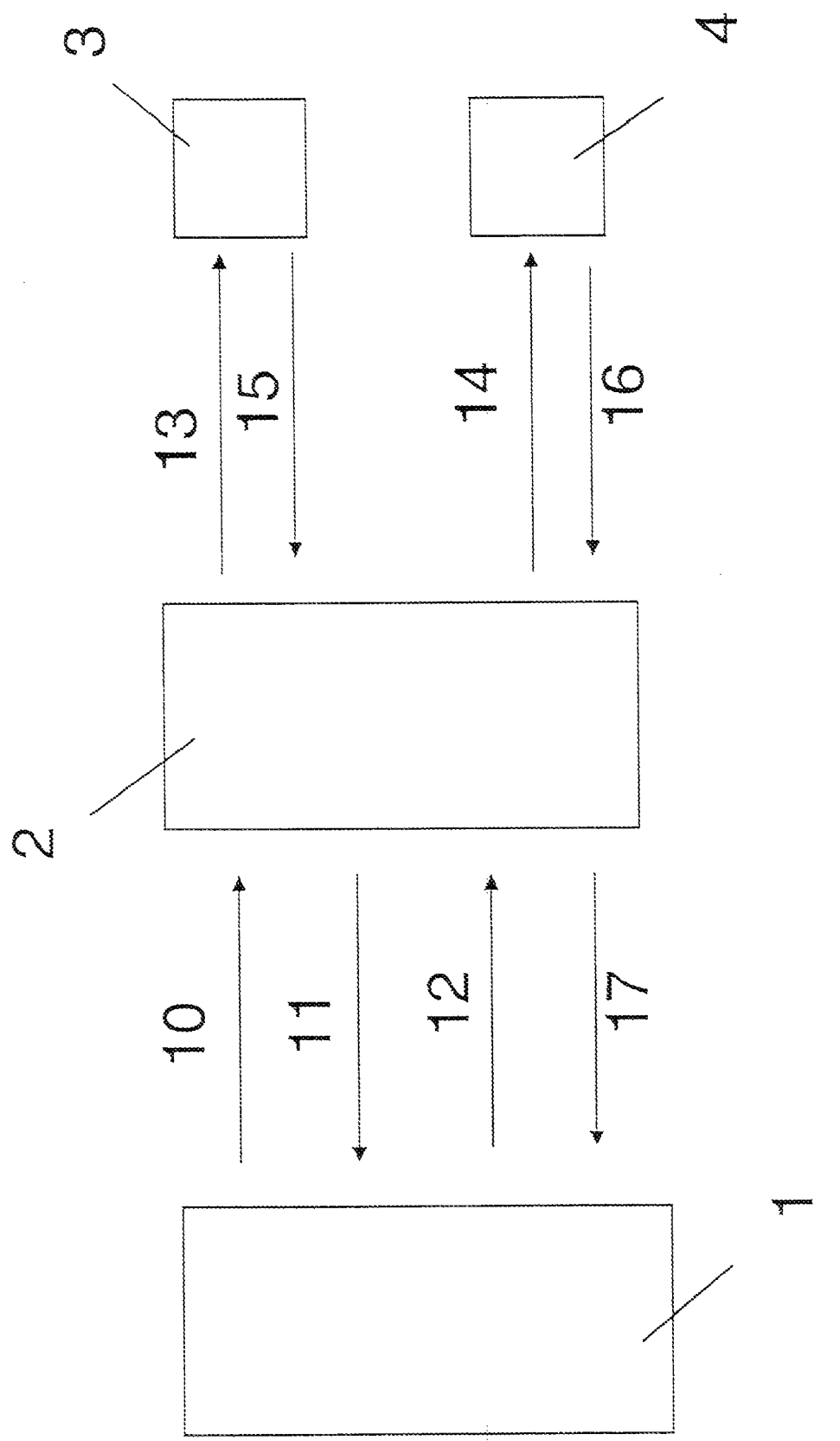
FIG. 1 is a diagram depicting the method according to one embodiment of the invention.

As shown in FIG. 1, a description is given of how an originator user associated with a mobile device 1 can send a photo to a plurality of recipients, respectively associated with mobile devices 3 and 4 is described. The sending device 1 sends 10 the photo to a server 2 via an MMS service (acronym meaning Multimedia Messaging Service). For this purpose, the sending device 1 can dial a specific short number which redirects the MMS message to the server 2. This short number is, for example, assigned by the mobile operator of the sending device 1.

The server 2 stores the photo and identifies it with a unique identifier. The server 2 then sends 11 an SMS (acronym meaning Short Message Service) message to the sending device 1. This SMS includes a clickable link which leads to a generator of pages which can be viewed by the sending device 1. This link has a unique identifier.

Figure 2:
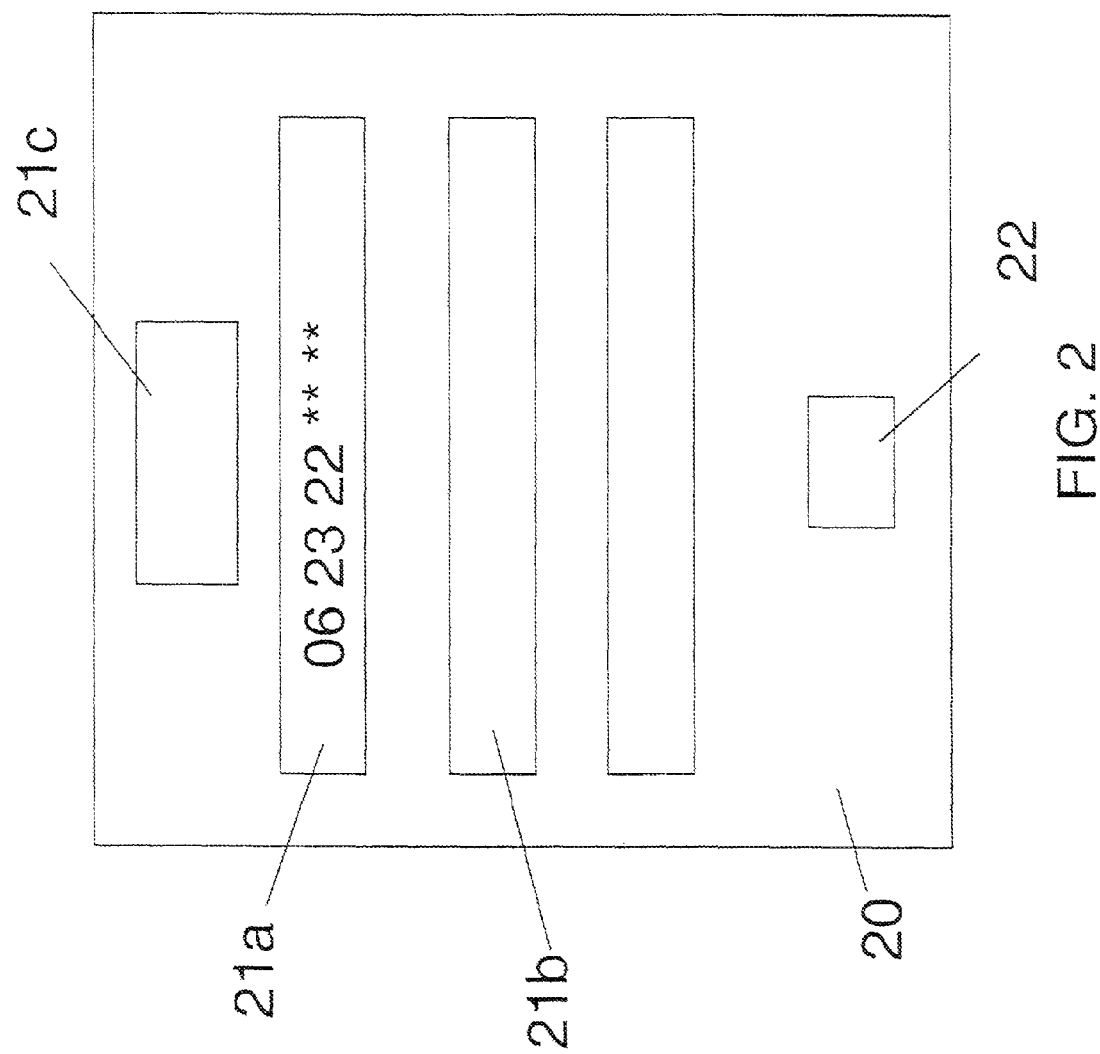
FIG. 2 depicts a recipient-selection page generated by a server according to one embodiment of the invention.

When the sending device 1 receives the SMS, the user associated with the sending device 1 can click on the link. The mobile device 1 is then configured, in a well-known manner, to connect 12 to the server 2. This is carried out, for example, by launching a WAP browser and transferring a WAP push request, of a known type, to the server 2. The server 2 then receives a connection request and the unique identifier of the link. It then generates a page which can be viewed by the mobile device 1. The visible page 20 includes several text boxes 21a, 21b making up a form as shown in FIG. 2. In the visible page 20, the user associated with the mobile device 1 is asked to enter the telephone numbers of the recipients of the photo. The user then enters these telephone numbers in the text boxes 21a and 21b. A clickable area 22 of the visible page 20 allows the user to confirm the numbers entered and to send the entered data to the server 2.

The server 2 receives the entered data and stores the entered telephone numbers in a database. The server 2 then sends 13, 14 each of the recipient devices 3, 4 an SMS containing a clickable link which leads to the page generator of the server 2. This link includes, in particular, a unique identifier which identifies the mobile device 1 and the photo.

When the recipient user associated with the mobile device 3 clicks on the link, the mobile device 3 connects 15 to the server 2. This is carried out, for example, by launching a WAP browser and transferring a WAP push request, of a known type, to the server 2. Thanks to the identifier contained in the link, the server 2 generates a page which can be viewed by the mobile device 3. This visible page 30 is shown in FIG. 3. It includes the photo 33, possibly a list of comments, and a text box 31 for entering comments. The user associated with the mobile device 3 can therefore enter comments on the photo 33 in the text box 31. If the user associated with the mobile device 4 also clicks on the link received by SMS, he/she obtains the same visible page 30 by connecting 16 to the server 2.

Once the photo 33 has been viewed by the users of the devices 3 and/or 4, and any relevant comments have been entered in the text box 31, the users of the devices 3 and/or 4 can click on a clickable submission area 32. The server 2 then receives the comments entered using the devices 3 and/or 4. The server 2 sends 17 a new SMS to the sending device 1. This SMS contains a clickable link which leads to the page generator of the server 2. This link includes a unique identifier which identifies the user of the mobile device 1, the photo and all the comments entered on the visible page. The user associated with the mobile device 1 can then click on the link so as to view the visible page including the photo and the list of comments possibly entered using the devices 3 and/or 4. In the new visible page, the user is once again asked to enter comments.

Variations on the previously described embodiment of the invention are described below. The method was described in relation to the sending of a photo in the initial MMS sent from the device 1 to the server 2. It is understood, however, that several photos can be sent in this MMS. In more general terms, any type of content can be sent from the device 1 to the server 2. Audiovisual content adapted to the MMS message format is preferable.

In addition, an embodiment was described in which an SMS including a clickable link was sent in step 13 to the recipients 3 and 4 in response to the user of the sending device 1 entering the recipients' telephone numbers. However, it is possible to program the server 2 to delay the sending of such SMS messages, in particular to optimise the number of SMS messages sent.

In addition, we have described the fact that a notification is sent in step 17 to the device 1 of the originator, so as to inform him/her when the photo has been viewed and/or any comments have been added. It is also possible for this notification also to be sent to the other numbers in the list defined by the user of the sending device 1. In the example described above, if the device 3 connects to the server 2 and views the photo, a notification can also be sent to the device 4.

Furthermore, we have described a step in which the originator user associated with the device 1 enters the list of recipient telephone numbers. In this second embodiment of the method according to the invention, it is also possible for a predefined list of recipient telephone numbers to be presented to the originator user. The server 2 is then arranged to display, in page 20, a list of predefined numbers. However, the originator user has the option of adding new numbers to this predefined list using the text boxes 21a and 21b. The server 2 therefore includes a database which stores a list of recipient telephone numbers for a given photo identifier and sending device 1. The list of telephone numbers can be updated, for example, by a specific interface, at any time, and not necessarily when sending a photo to the server 2.

Furthermore, in order to make the photo available to the general public and not only to specific recipients, according to the invention, the recipient-selection page 20 can include a special field 21c. When this special field 21c is activated by the user, the list of recipients includes the address of a dissemination server, such as a blog. A page which can be accessed over the internet is then built in this dissemination server. This page includes, like the previously defined page 30, the photo 33 and an area for entering comments 31. The general public can then view the photo by means of this page. According to this embodiment, the dissemination server providing public access to the content page 30 is a specific recipient, like the devices 3 and 4.

In addition, in the context of the invention, requests are sent by the devices 1, 3 or 4 to the server 2, and the server 2 can detect an identifier of the mobile devices 1, 3 or 4, for example an MSISDN identifier, allowing it to identify the characteristics of the devices. The visible pages 20 and 30 can then be adapted to the display capacities of the mobile devices 1, 3 or 4. The format of these pages, for example the WAP format, can therefore change according to the type of mobile device used.

The invention claimed is:

1. A method for sending content from a mobile sending device belonging to an originator to at least one receiving device associated with a respective recipient, the method comprising:

the content originates from the mobile sending device;

the mobile sending device sends the content to a storage server in an MMS message, only one content transmission is necessary from the originator to the storage server regardless of how many separate receiving devices are to receive the content;

the storage server stores the content, associating a content identifier with it;

the storage server builds a content page including the content, the content page being associated with a first address, the first address depending at least on the content identifier;

the storage server sends the mobile sending device a first SMS message including a first WAP push link based on a second address associated with a recipient-selection page;

the mobile sending device accesses the recipient-selection page by activating the first WAP push link, so as to open a WAP browser in the sending device to the second address;

the originator builds, using the recipient-selection page, a list including an identifier of the receiving device;

the server sends the receiving device a second message including at least the first address; and the recipient accesses the content page using the first address.

2. The method according to claim 1, wherein the mobile sending device is a mobile telephone, the at least one receiving device includes at least two mobile telephones, and the mobile telephones only require browsing functionalities in order to open the content pages.

3. The method according to claim 1, wherein the server sends the second message to the receiving device in an SMS message including the second address as a second WAP push link and the receiving device accesses the content page based on the second address, by activating the second WAP push link, so as to open a WAP browser in the receiving device to the second address.

4. The method according to claim 1, wherein the content includes a photograph.

5. The method according to claim 1, wherein the content includes text entered by the originator.

6. The method according to claim 1, further comprising the originator selecting the recipient who can view the content by the originator selecting the second address which is associated with the recipient.

7. A method for sending content between an originating mobile sender and desired recipients, the method comprising:
using the originating mobile sender to select content to be sent;
sending the selected content from the originating sender to a server in an MMS message;
using the server to associate a content identifier with the content;
using the server to create a content page associated with an address of the originating mobile sender and content identifier;
using the server to send the originating mobile sender an SMS message including a WAP push link based on an address associated with a recipient-selection page;
using the originating mobile sender to access the recipient-selection page by activating the WAP push link in order to open a WAP browser;
using the originating mobile sender, specifying addresses associated with the desired recipients;
causing the server to send the desired recipients an electrical message including an address associated with the content page;
allowing the desired recipients to access the content page using the content page address;
the sender and the desired recipients using WAP browsers to access the content stored at the server; and
at least one of the desired recipients sending an electrical communications response to the server which is accessible by the originating mobile sender and at least another of the desired recipients.

8. The method of claim 7, further comprising sending a message to the desired recipients in an SMS message including the recipient-selection page address as a WAP push link, and the desired recipients accessing the content page using the recipient-selection page address in order to open the browsers which are WAP browsers.

9. The method of claim 7, wherein the content includes a photograph.

10. The method of claim 7, wherein the content includes text entered by the originating mobile sender on a mobile electronic communications device.

11. The method of claim 7, wherein the mobile sender and the desired recipients are mobile telephones.

12. The method of claim 7, further comprising entering individual identification numbers associated with the desired recipients in a designated text box on the originating mobile sender, sending a message with a clickable link from the server to the desired recipients and entering a blog dissemination server address using the recipient-selection page.

13. The method of claim 7, further comprising the server detecting an identifier and associated characteristics of the sender and the desired recipients, and displaying the characteristics in a visible manner to the sender and the desired recipients.

14. A method for sending visual content between an originating sender and desired recipient, the method comprising:
using the originating sender to select the visual content to be sent;
sending the selected visual content from the originating sender to a server;
using the server to associate a content identifier with the visual content;
using the server to create a content page associated with an address of the originating sender and content identifier;
using the server to send the originating sender a message including an address associated with a recipient-selection page;
selecting at least one address associated with the desired recipients;
causing the server to send the desired recipients a message including an address associated with the content page;
allowing the desired recipients to access the content page using the content page address;
the sender and the desired recipients accessing the visual content from the server;
at least one of the desired recipients sending a communications response to the server which is accessible by the originating sender and at least another of the desired recipients;
sending the content to the server in an MMS message, sending a message from the server to the originating sender in an SMS message;
sending a message to the desired recipients in an SMS message including the recipient-selection page address, the desired recipients accessing the content page using the recipient-selection page address; and
entering individual identifiers associated with the desired recipients in a designated text box on the originating sender, sending a message with a clickable link from the server to the desired recipients and entering a blog dissemination server address using the recipient-selection page.

15. The method of claim 14, wherein the visual content includes a photograph.

16. The method of claim 14, wherein the visual content includes text entered on the originating mobile sender.

17. The method of claim 14, wherein the originating sender and the desired recipients are mobile telephones.

18. The method of claim 14, further comprising viewing the content page stored on the server with browsers.

* * * * *